US012679444B2

(12) United States Patent
Poonawala et al.

(10) Patent No.: US 12,679,444 B2
(45) Date of Patent: Jul. 14, 2026

(54) SYSTEMS AND METHODS FOR AN ELECTRIC STEERING SYSTEM

(71) Applicant: DANA ITALIA S.R.L., Arco (IT)

(72) Inventors: Idris Poonawala, Pune (IN); Sudatta Karmarkar, Pune (IN); Paresh Joshi, Pune (IN)

(73) Assignee: DANA ITALIA S.R.L., Arco (IT)

( * ) Notice: Subject to any disclaimer, the term of this patent is extended or adjusted under 35 U.S.C. 154(b) by 750 days.

(21) Appl. No.: 18/152,048

(22) Filed: Jan. 9, 2023

(65) Prior Publication Data

US 2024/0227920 A1    Jul. 11, 2024

(51) Int. Cl.
| | |
|---|---|
| *B62D 5/04* | (2006.01) |
| *B62D 3/06* | (2006.01) |
| *B62D 3/12* | (2006.01) |
| *B62D 5/00* | (2006.01) |
| *B62D 7/18* | (2006.01) |

(52) U.S. Cl.
CPC ............. *B62D 5/0436* (2013.01); *B62D 3/06* (2013.01); *B62D 3/12* (2013.01); *B62D 5/005* (2013.01); *B62D 5/0421* (2013.01); *B62D 5/043* (2013.01); *B62D 5/0448* (2013.01); *B62D 5/046* (2013.01); *B62D 5/0463* (2013.01); *B62D 7/18* (2013.01)

(58) Field of Classification Search
CPC .... B62D 5/0436; B62D 5/005; B62D 5/0421; B62D 5/0448; B62D 5/046; B62D 7/18; B62D 5/043; B62D 3/06; B62D 3/12; B62D 5/0463
See application file for complete search history.

(56) References Cited

U.S. PATENT DOCUMENTS

| | | | | | |
|---|---|---|---|---|---|
| RE23,550 | E | * | 9/1952 | Staude ................... | B62D 5/043 |
| | | | | | 74/388 R |
| 3,968,705 | A | * | 7/1976 | Amano ................... | F16H 35/10 |
| | | | | | 408/11 |
| 4,318,304 | A | * | 3/1982 | Lang ................... | F16H 25/2021 |
| | | | | | 74/412 TA |
| 4,376,401 | A | * | 3/1983 | Borzym ................. | B23D 25/04 |
| | | | | | 83/628 |
| 4,593,781 | A | * | 6/1986 | Galtier ................. | B62D 5/0448 |
| | | | | | 180/444 |
| 4,694,925 | A | * | 9/1987 | Roberts ................ | B62D 5/0427 |
| | | | | | 180/444 |

(Continued)

FOREIGN PATENT DOCUMENTS

| | | |
|---|---|---|
| DE | 102010042785 A1 | 4/2012 |
| JP | 2008260462 A | 10/2008 |
| JP | 7052529 B2 | 4/2022 |

*Primary Examiner* — Timothy Wilhelm
(74) *Attorney, Agent, or Firm* — McCoy Russell LLP

(57) ABSTRACT

Methods and systems are provided for a steer-by-wire system. In one example, a steer-by-wire system comprises an electric motor coupled to a steering axle via a bevel gear set, where a rotor of the electric motor is perpendicular to the steering axle, and the bevel gear set comprises a first bevel gear and a second bevel gear. The steer-by-wire system includes an overload protection arrangement, where the second bevel gear is normally coupled to a ball screw nut via a plurality of locking pins, the plurality of locking pins disengaging from the second bevel gear and allowing slipping of the ball screw nut in response to an external impact load acting on the ball screw nut exceeding a threshold.

19 Claims, 9 Drawing Sheets

(56)　　　　　References Cited

U.S. PATENT DOCUMENTS

| | | | | |
|---|---|---|---|---|
| 5,165,495 A * | 11/1992 | Fujii | ................... | B62D 5/0409<br>180/444 |
| 5,240,445 A * | 8/1993 | Aoki | ...................... | B63H 25/16<br>440/58 |
| 5,531,408 A * | 7/1996 | Wechselberger | ......... | B61L 5/02<br>246/291 |
| 5,819,871 A * | 10/1998 | Takaoka | ................ | B62D 5/043<br>192/37 |
| 5,916,325 A * | 6/1999 | Madrid | .................... | F16D 7/10<br>464/37 |
| 5,971,094 A * | 10/1999 | Joshita | .................. | B62D 5/043<br>403/372 |
| 6,155,376 A * | 12/2000 | Cheng | ................. | B62D 5/0421<br>180/444 |
| 6,547,029 B2 * | 4/2003 | Peppler | ................ | B62D 5/092<br>180/443 |
| 6,817,437 B2 * | 11/2004 | Magnus | ................ | B62D 5/006<br>180/443 |
| 6,848,534 B2 * | 2/2005 | Toyofuku | ................ | H02K 7/06<br>180/443 |
| 6,854,556 B1 * | 2/2005 | Yamamoto | ........... | F16D 1/0835<br>180/443 |
| 6,871,127 B2 | 3/2005 | Dominke et al. | | |
| 6,889,795 B2 * | 5/2005 | Shibata | ................ | B62D 5/0421<br>180/444 |
| 7,159,690 B2 * | 1/2007 | Murakami | ........... | B62D 5/0448<br>180/444 |
| 7,175,558 B2 * | 2/2007 | Puiu | ........................ | F16D 28/00<br>475/225 |
| 7,610,828 B2 * | 11/2009 | Wingett | ................ | B64C 13/505<br>244/99.2 |
| 8,397,859 B2 * | 3/2013 | Asakura | ............... | B62D 5/0448<br>180/444 |
| 9,347,535 B1 * | 5/2016 | Sheahan, Jr. | ........... | F16D 11/16 |
| 9,623,900 B2 | 4/2017 | Yukitake | | |
| 11,149,829 B2 * | 10/2021 | Matsuto | ................... | H02K 7/06 |
| 12,187,359 B2 * | 1/2025 | Park | ........................ | B62D 5/043 |
| 2003/0047374 A1 * | 3/2003 | Peppler | ................ | B62D 5/0421<br>180/443 |
| 2003/0069559 A1 | 4/2003 | Platt et al. | | |
| 2005/0016790 A1 | 1/2005 | Murakami et al. | | |
| 2006/0278466 A1 | 12/2006 | Cheng | | |
| 2009/0024281 A1 | 1/2009 | Hwang | | |
| 2019/0168800 A1 | 6/2019 | Urbach et al. | | |
| 2020/0406960 A1 | 12/2020 | Anetzberger | | |
| 2021/0261186 A1 | 8/2021 | Hikida et al. | | |

* cited by examiner

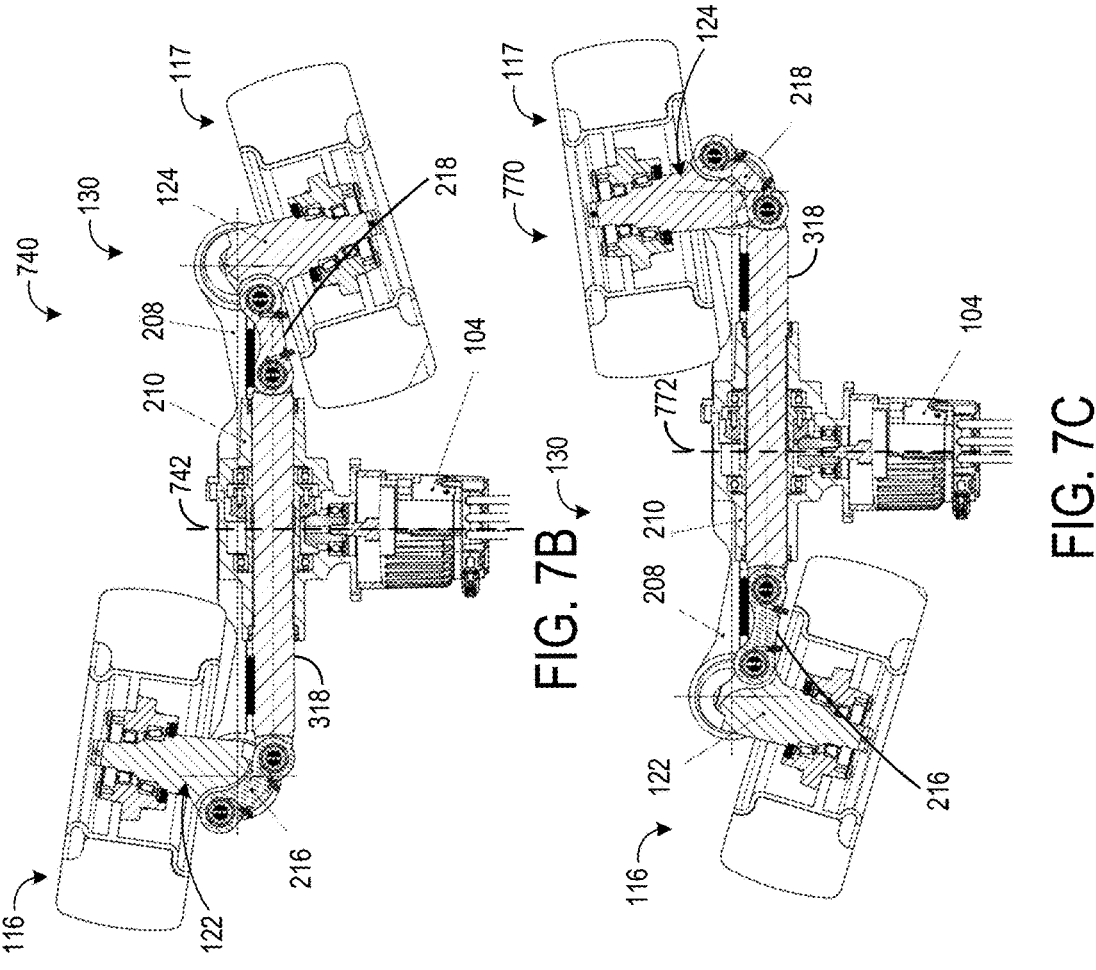
FIG. 7B
FIG. 7C
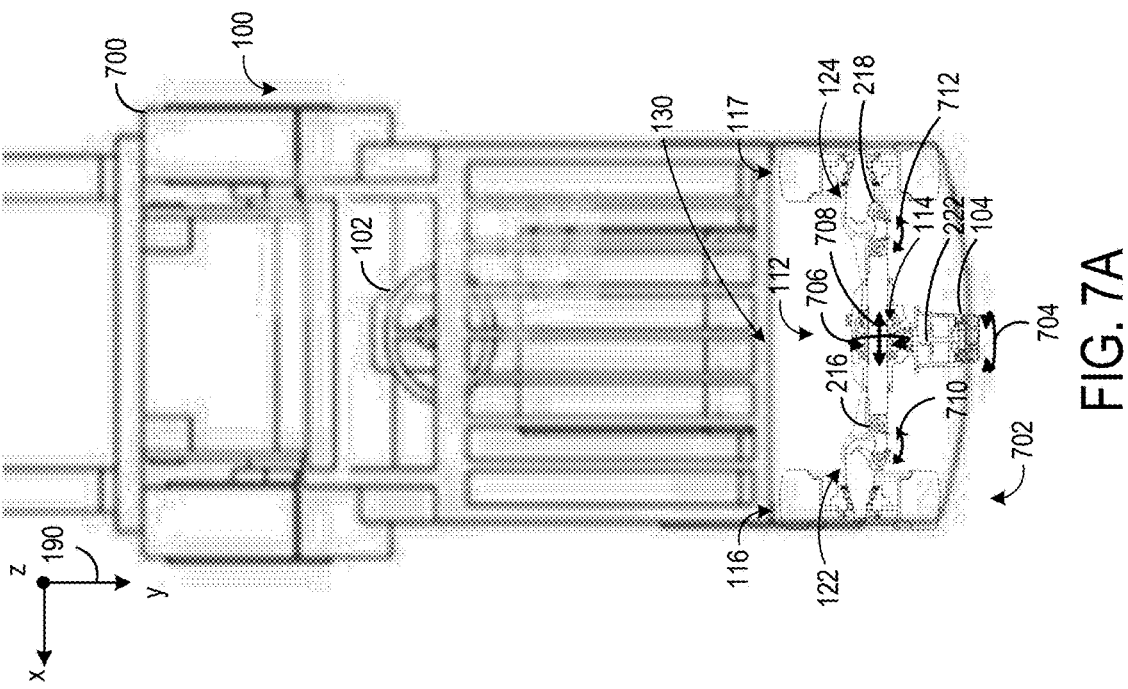
FIG. 7A

SYSTEMS AND METHODS FOR AN ELECTRIC STEERING SYSTEM

TECHNICAL FIELD

The present description relates generally to methods and systems for a vehicle steering system, and particularly, for a steer-by-wire system.

BACKGROUND AND SUMMARY

A vehicle may be adapted with a steering axle assembly to allow a driver to control vehicle navigation. Traditionally, the steering axle assembly includes a steering wheel having a mechanical linkage to a steering rack via a steering column. The steering rack is then connected to road wheels. In this arrangement, steering force is provided by the driver. The amount of steering force to turn may be influenced by various factors such as road conditions, vehicle type, and loading.

Traditional steering axle assemblies having mechanical linkages may lack turning precision. An imprecise steering ratio may be particularly salient when the driver navigates a tight corner at a low speed. Relatedly, mechanically linked steering axle assemblies may be difficult for the driver to maneuver, such as during conditions where a great amount of steering force is demanded to turn. As another example, mechanically linked steering axle assemblies include many components that may degrade over time. For vehicles in work settings, such as forklifts, external impact loads on the driving wheels is a common stress on components of the steering axle. As such, performance of the vehicle may deteriorate over the lifetime of the steering axle assembly. In another example, the components of the steering axle assembly are often bulky and pose challenges for space-efficient packaging in the vehicle.

Steering assist systems have been developed to reduce effort to turn. For example, a steering axle assembly having a steering assist system may be configured as above, including the steering wheel mechanically linked to the steering rack via the steering column, and the steering rack connected to the road wheels. In addition, a steering assist unit may connect to the steering rack with a gear connection between the steering rack and an electric motor. The steering assist unit may include a steering actuator on the steering column that provides a signal to a controller. In response to receiving a signal from the driver, the controller controls the electric motor to provide assisting torque in the steering system. Such steering assist systems reduce an amount of effort demanded to turn the vehicle; however, component wear and system packaging remain challenges. For example, in addition to component wear on the steering column, bearings, and other components, external impact load on the wheels may degrade the electric motor in such steering assist systems.

In one example, the issues described above may be addressed by a steer-by-wire system comprising: an electric motor coupled to a steering axle via a bevel gear set, where a rotor of the motor is perpendicular to the steering axle, and the bevel gear set comprises a first bevel gear and a second bevel gear; an overload protection arrangement, where the second bevel gear is normally coupled to a ball screw nut via a plurality of locking pins, the plurality of locking pins disengaging from the second bevel gear and allowing slipping of the ball screw nut in response to an external impact load acting on the ball screw nut exceeding a threshold.

In this way, by achieving steering precision and reducing human-powered steering effort without any mechanical linkage between the steering wheel and the steering axle, and mechanically protecting the electric motor from overload impact, incidences that may increase wear to the electric axle are reduced and components that may otherwise be subject to wear are avoided, increasing the life of the system and reducing overall packaging size. By including a mechanical overload protection arrangement, overload impact is mitigated without additional sensors or complicated control logic. The result is a highly responsive and durable electric steering system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 7A is an illustration of an example of articulation of the steer-by-wire system shown in FIG. 1.

FIG. 7B is a detail view of a first position of the steer-by-wire system shown in FIG. 7A.

FIG. 7C is a detail view of a second position of the steer-by-wire system shown in FIG. 7A.

DETAILED DESCRIPTION

The following description relates to systems and methods for a steering axle assembly. The steering axle assembly is a steer-by-wire system that may be implemented in a vehicle to enable steering control of the vehicle. The steer-by-wire system includes an electric motor mounted on a central housing of a steering axle via a bevel gear set and ball screw arrangement. A rotor of the electric motor is arranged perpendicular to the steering axle, an arrangement that achieves increased turning capability by eliminating wheel interference with the motor at a fully steered position. The electric motor is controlled using steer-by-wire based on control signals including driver input from a feedback actuator coupled to a steering wheel and a steering sensor coupled to the steering axle. The increased turning range provided by the perpendicular mounted motor and responsiveness of the steer-by-wire system enables the driver to navigate in narrower spaces more quickly and with more deliberate control; however, enabling the driver to work more quickly can increase the incidence of greater, or more frequent external impact on the wheels. Therefore the disclosed system mechanically disengages the electric motor from the steering rack impact until the impact subsides, which reduces wear on the electric motor without adding additional control logic, sensors, etc.

External impact stress on the electric motor is mitigated by an overload protection arrangement that protects and cushions the electric steering axle from load impact. In one example, the overload protection arrangement includes an output bevel gear normally coupled to a ball screw nut via a plurality of locking pins (or latching pins). The locking pins may be tapered in some examples. Each locking pin engages with a corresponding slot in the output bevel gear due to a corresponding spring acting on each pin. In response to an impact load acting on the ball screw nut exceeding a threshold, the plurality of locking pins are pushed against the springs thereby disengaging the second bevel gear and allowing slipping of the ball screw nut. In this way, the mechanical overload protection operation allows for the use of a simple steer-by-wire control logic that relies on relatively few signal inputs at the same time reducing wear on the electric motor from external impact load. This is advantageous in in work site environments and particularly so with the highly-responsive steer-by-wire system disclosed.

Figure 1:
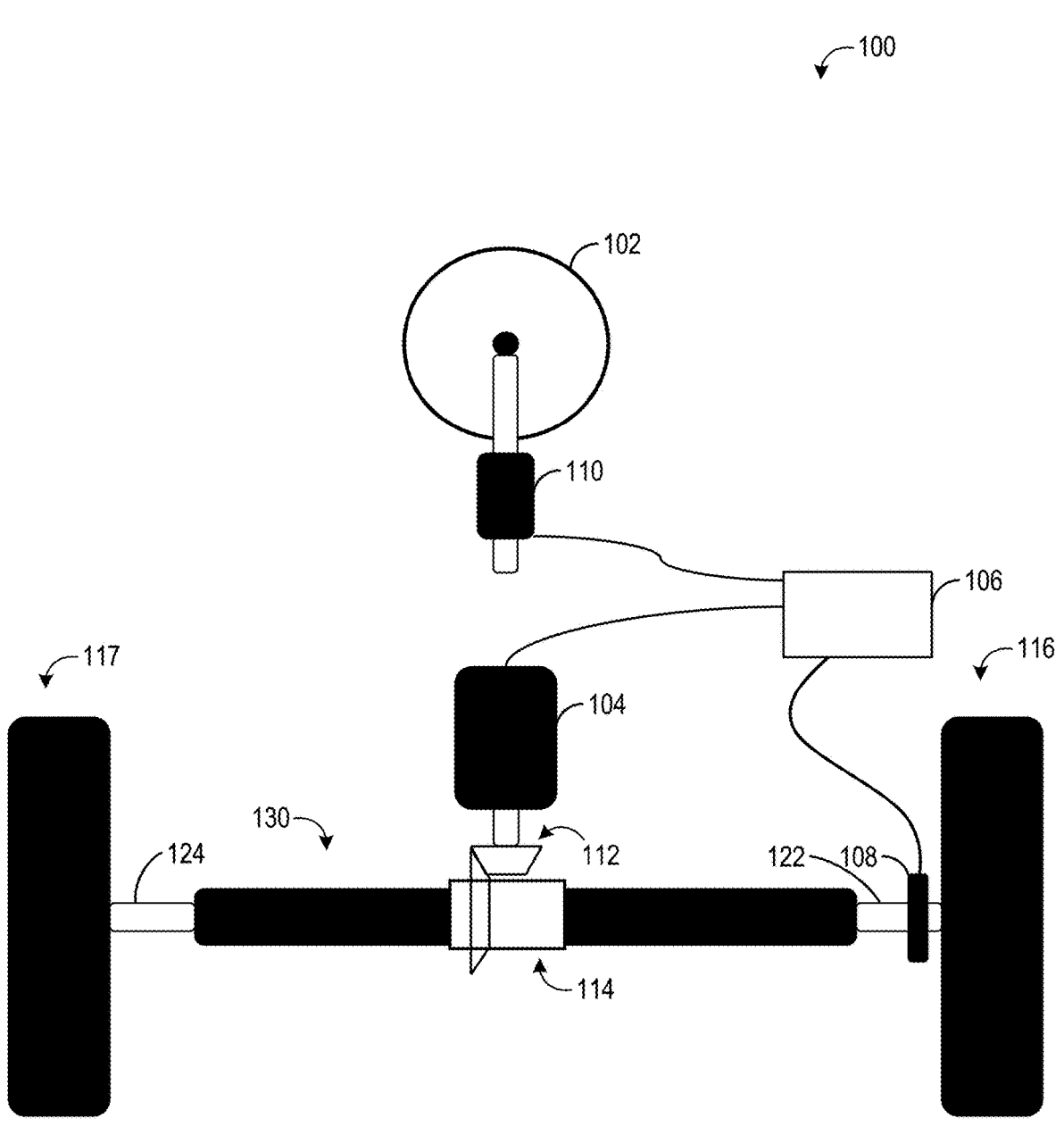
FIG. 1 is a schematic diagram of a steer-by-wire system for a vehicle system.
Figure 2:
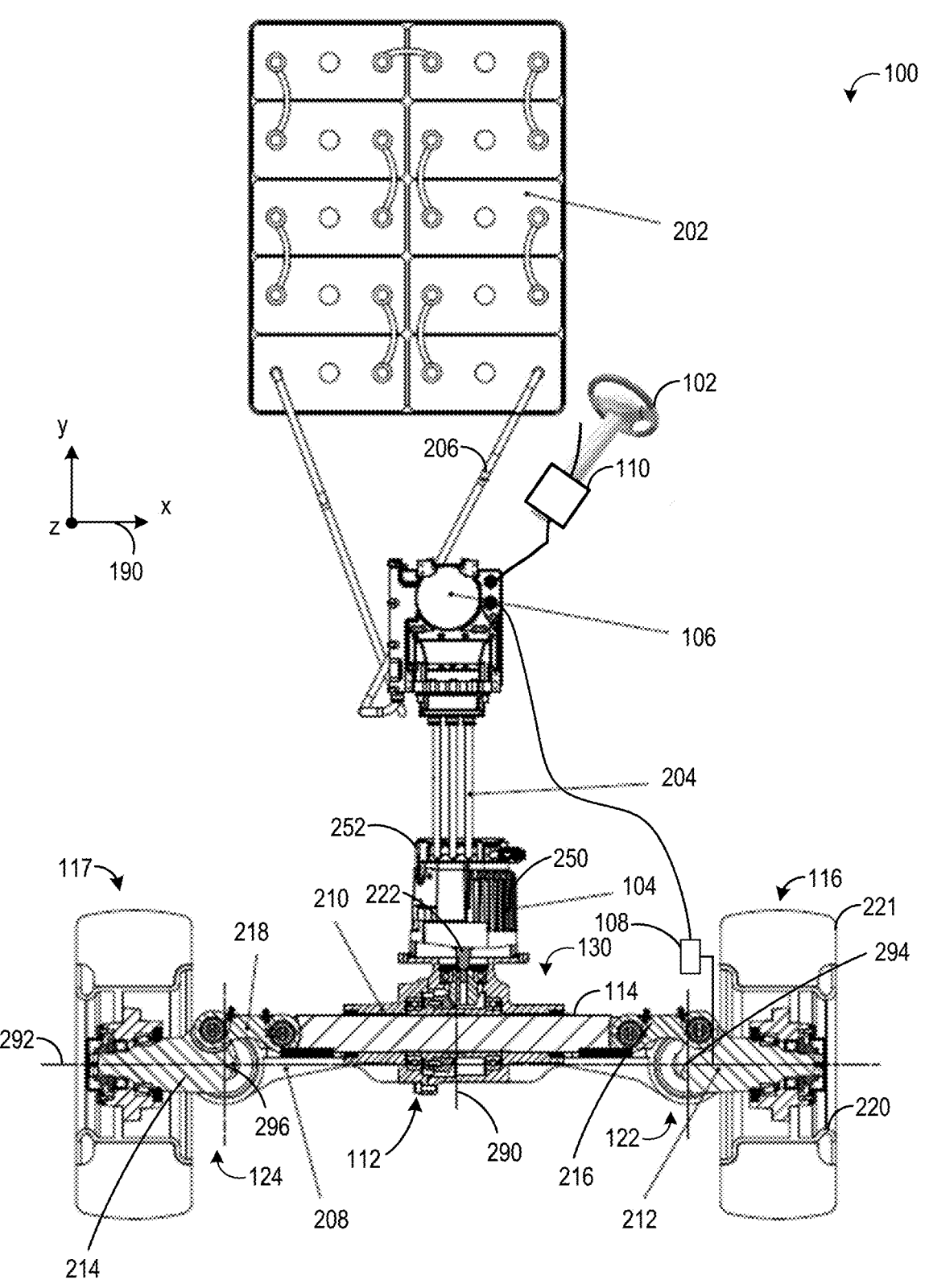
FIG. 2 is an example of the steer-by-wire system shown in FIG. 1.
Figure 3:
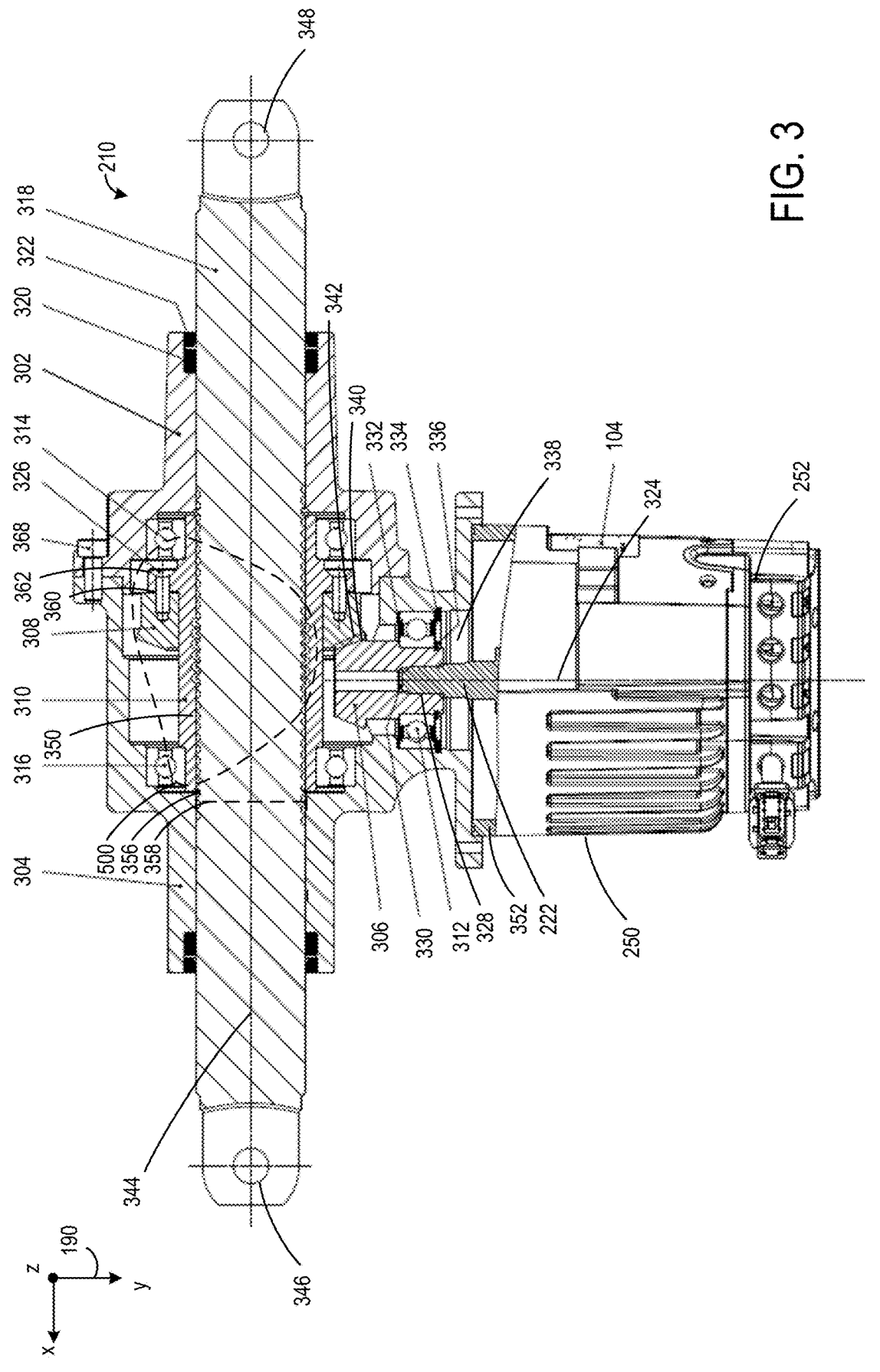
FIG. 3 is a sectional view of an example of a central housing assembly for the steer-by-wire system shown in FIG. 1.
Figure 4:
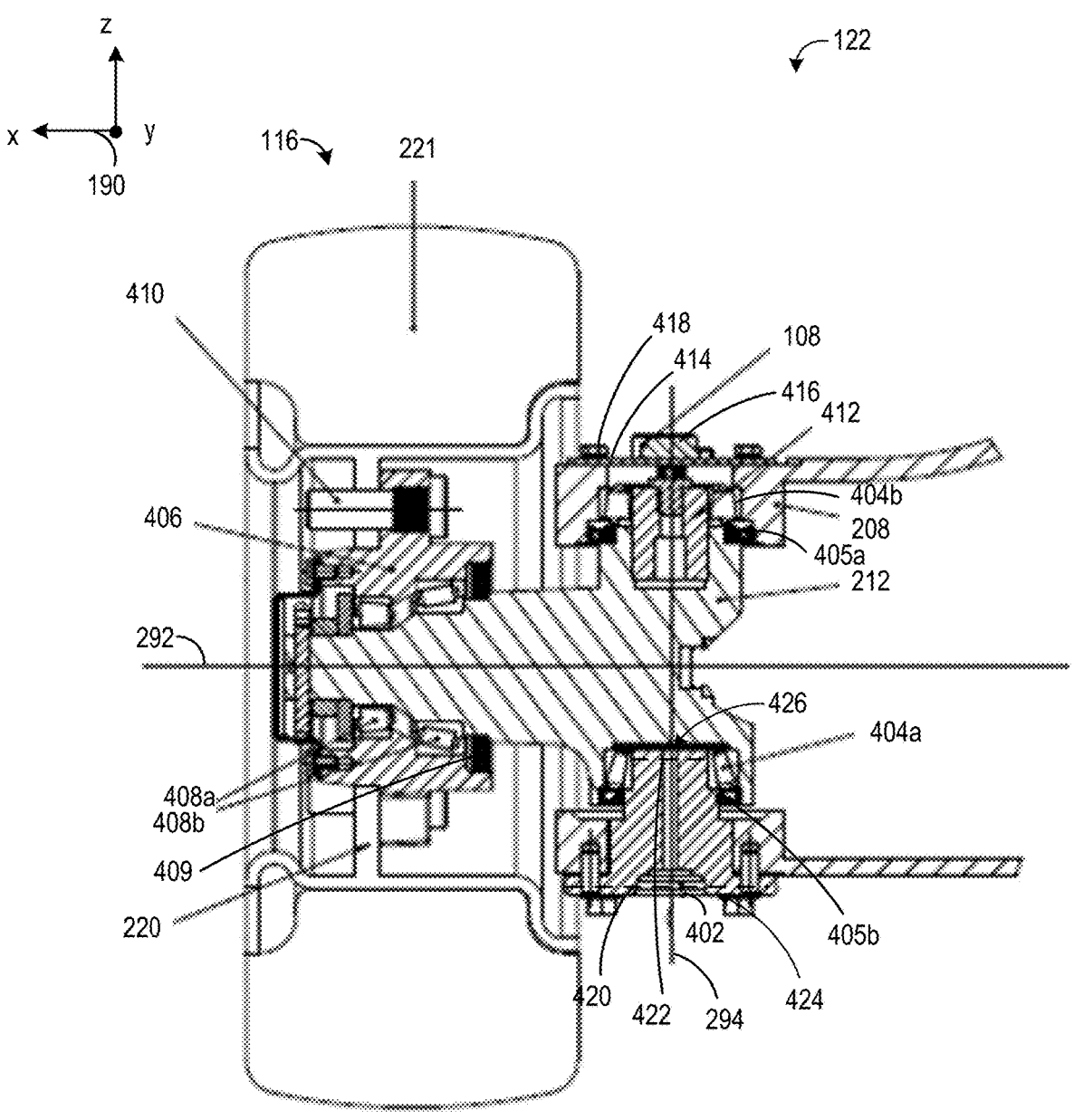
FIG. 4 is a cross sectional view of an example of a knuckle assembly for the steer-by-wire system shown in FIG. 1.
Figure 5:
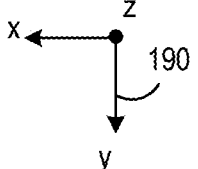
FIG. 5 is a detail sectional view of an example of a ball screw arrangement for the steer-by-wire system shown in FIG. 1.
Figure 5:
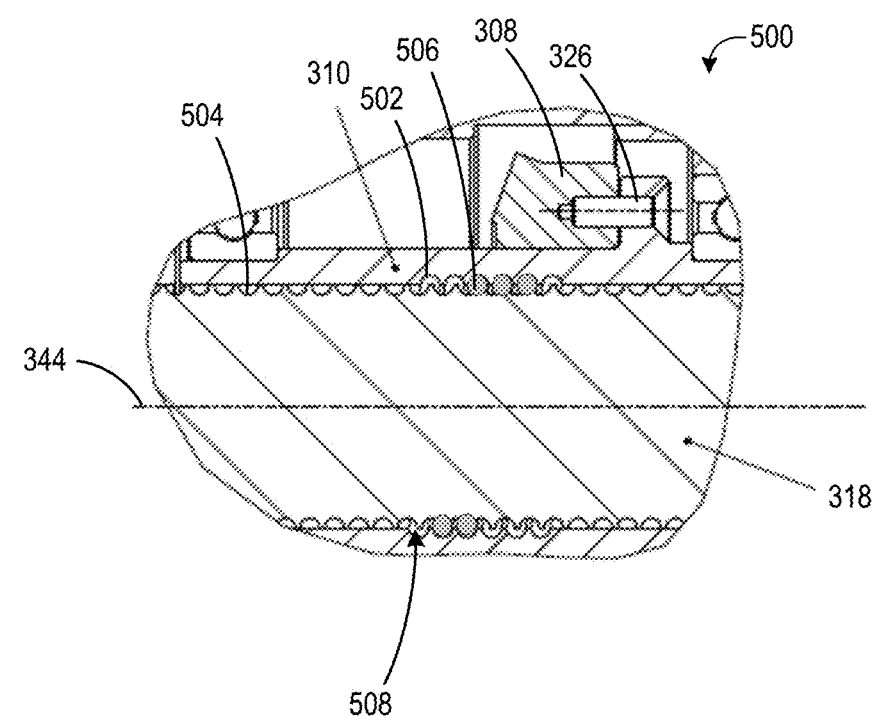
Figure 6:
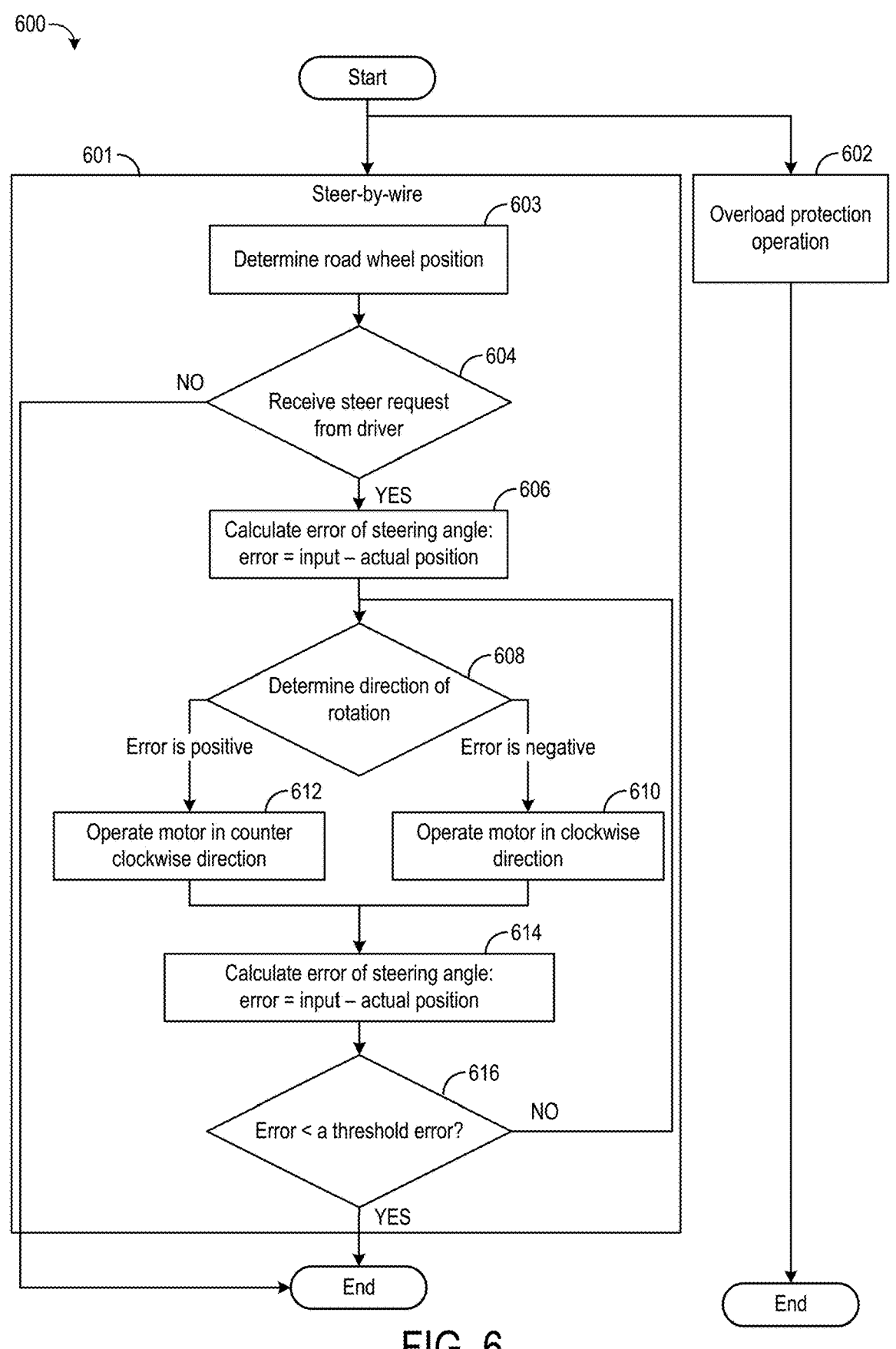
FIG. 6 is a flow chart illustrating of an example control logic for the steer-by-wire system shown in FIG. 1.

A schematic diagram of the steer-by-wire system for a vehicle is depicted in FIG. 1. In one example, the vehicle may be a forklift truck, as shown in FIG. 7A, and the steering axle assembly may be included at a rear axle of the forklift truck. However, the vehicle may be another vehicle of various types of heavy-duty vehicles. The steer-by-wire system may provide fully electric steering control without any mechanical linkage between the steering wheel and the steering axle system. The steer-by-wire system has no hydraulic connection and uses no hydraulic oil for actuation. An example of the steer-by-wire system including a partial cross section is depicted in FIG. 2. FIG. 3 shows a cross-section view of an example of a central housing for the steer-by-wire system including a zero bevel gear supported by ball bearings. An electric motor is coupled to the central housing, where a rotor of the electric motor is arranged perpendicular to the steering axle. A cross section view of an example of a knuckle assembly for the steer-by-wire system is shown in FIG. 4. The steer-by-wire may include a high-efficiency ball-screw arrangement to convert rotary motion to linear motion. A detail view of an example of the ball-screw arrangement is shown in FIG. 5. A method for operating the steer-by-wire system with overload protection is shown in FIG. 6. The perpendicular arrangement of the electric motor with respect to the central housing enables increased turning precision. Articulation of the electric steering axle is shown in FIGS. 7A, 7B, and 7C. An example of the overload protection arrangement is shown in cross-section in shown in FIG. 8A and in another view in FIG. 8B. For reference, a schematic diagram representing a steering axle assembly having a mechanical linkage between a steering wheel and steering axle is shown in FIG. 9. A schematic diagram representing a mechanically-linked steering axle having a steering assist system is shown in FIG. 10.

FIGS. 2-5 and FIGS. 7A-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5 and 7A-8B are shown approximately to scale.

FIG. 1 shows a schematic diagram of a steer-by-wire system 100. The steer-by-wire system 100 may be included in a vehicle such as a forklift truck (e.g., forklift truck 700 in FIG. 7A). The steer-by-wire system 100 includes a steering wheel 102, an electric motor 104, and a controller 106 in electronic communication with an actuator 110, a sensor 108, and the electric motor 104. The electric motor 104 is coupled to a steering axle 130 via a bevel gear set 112 and ball screw arrangement 114. A first road wheel assembly 116 may couple to the steering axle 130 via a first knuckle assembly 122. A second road wheel assembly 117 may couple to an opposing end of the steering axle 130 via a second knuckle assembly 124.

The steer-by-wire system 100 is an electric steering axle assembly having no mechanical linkage between the steering wheel 102 and the steering axle 130. Rather, steering control may be achieved through coordination between the controller 106 and the electric motor 104 based on control signals received from the actuator 110 coupled to and receiving driver input from the steering wheel 102 and the sensor 108 coupled to and receiving feedback from the steering axle 130. In one example, the actuator 110 may be a feedback actuator. In one example, the controller 106 may determine a steering request, such as, a steering angle and a steering velocity based on driver input via the actuator, such as, how rapidly and/or how severely the driver turns the steering wheel 102. In one example, the sensor 108 may be a steering sensor coupled near at least one road wheel. For example, the sensor 108 is coupled to the first knuckle assembly 122. In one example, the sensor 108 may measure an actual wheel position. In one example, the sensor 108 may be a hall effect angle sensor. The controller 106 processes the signals received from the actuator 110 and the sensor 108 and outputs a control signal to the electric motor 104 coupled to the bevel gear set 112 and ball screw arrangement 114.

In the example schematic diagram, driver steering input is provided via the steering wheel 102. For example, a driver may apply torque to the steering wheel 102, which is received by controller 106 via the actuator 110. The controller 106 may provide feedback to the driver by transmitting a signal to the actuator 110. For example, the controller 106 may control the actuator 110 to apply torque to the steering wheel 102. In other examples, driver steering input may be provided via a joystick or a twin lever steering apparatus and the controller 106 may provide feedback to the driver via the joystick or other steering apparatus.

Having no mechanical linkage between the steering wheel 102 and the steering axle 130, the steer-by-wire system 100 reduces the number of components that may be subject to wear. As another advantage, the steer-by-wire system 100 may recalibrate itself according to vehicle driving conditions such as vehicle load, terrain, and so on. For example, during operation of the vehicle, the steering effort required to steer the vehicle varies with the load on the axle, the terrain, and so on. With the disclosed steer-by-wire system, such as described with reference steer-by-wire system 100, the controller may monitor the motor operating condition, and as load varies, the controller may accordingly regulate the current to the electric motor. In situations where the load reduces, the controller may recalibrate to the load condition and draw less current, thereby improving the battery utilization. In this way, the vehicle operates at an overall increased efficiency. As further advantage, the electronic communication within the steer-by-wire system 100 is achieved using flexible cabling that reduces overall packaging size.

A set of reference axes 190 are provided in FIG. 2 and in following figures. The reference axes 190 indicate a y-axis, an x-axis, and a z-axis. In one example, the z-axis may be parallel with a direction of gravity and the x-y plane may be parallel with a horizontal plane that the steer-by-wire system 100 may rest upon. A filled circle may represent an arrow and axis facing toward, or positive to, a view. An unfilled circle may represent an arrow and an axis facing away, or negative to, a view.

A top view of a steer-by-wire system is illustrated in FIG. 2. In one example, the steer-by-wire system may be the same or similar to the steer-by-wire system 100. Components illustrated with respect to the steer-by-wire system 100 that are shown in FIG. 1 are labeled similarly and not reintroduced. In addition to the components introduced with reference to FIG. 1, the steer-by-wire system 100 further includes a battery 202, phase cables 204, DC cables 206, an axle frame 208, a central housing assembly 210, a first knuckle housing 212, and second knuckle housing 214. The steering axle 130, the first road wheel assembly 116, the second road wheel assembly 117, and a portion of the electric motor 104 are shown in a sectional view to reveal internal arrangements of the components. The sensor 108 and the actuator 110 shown schematically. A vehicle center line 290 is included for reference.

The electric motor 104 is mounted on the central housing assembly 210 of the steering axle 130. The electric motor 104 includes a stator 250 and an end plate 252. The stator 250 encloses an armature (not shown) coupled to a motor input shaft 222. The bevel gear set 112 and ball screw arrangement 114 are at least partially enclosed by the central housing assembly 210. The electric motor 104 engages with the bevel gear set 112 and ball screw arrangement 114 via the motor input shaft 222.

In one example, the battery 202 may be the power source for the vehicle. The battery 202 may provide DC power to the controller 106 via the DC cables 206. The controller 106 may include an inverter for converting the DC power to three-phase AC power. The three-phase AC power may be supplied to the electric motor 104 via phase cables 204. The electric motor 104 converts the electric power to mechanical power and transfers the mechanical power to bevel gear set 112.

The bevel gear set 112 and ball screw arrangement 114 couple the electric motor 104 to the first road wheel assembly 116 and the second road wheel assembly 117. For example, first road wheel assembly 116 may be rotatably mounted to the first knuckle housing 212 and the first knuckle housing 212 may be coupled to the ball screw arrangement 114 via a first connecting rod 216. The first connecting rod 216 is coupled using pin connections that allow the first knuckle housing 212 to rotate about its axis in a geometrically controlled manner. Similarly, the second road wheel assembly 117 may be rotatably mounted to the second knuckle housing 214 and the second knuckle housing 214 may be coupled to the ball screw arrangement 114 via a second connecting rod 218. The first connecting rod 216 and second connecting rod 218 may each be hinged connections about which that the first road wheel assembly 116 and second road wheel assembly 117 may rotate, respectively. The first road wheel assembly 116 and the second road wheel assembly 117 may each include a wheel rim. The wheel rim may be assembled to the knuckle housing and the road wheel is installed on the wheel rim. For example, the first road wheel assembly 116 includes a first wheel rim 220 is assembled to the first knuckle housing 212 and the first road wheel 221 is installed on the first wheel rim 220. The first road wheel assembly 116 may rotate about a first pivot point 294. The second road wheel assembly 117 may rotate about a second pivot point 296. An example knuckle of the steer-by-wire system 100 and road wheel mounting thereto is described in more detail with respect to FIG. 4.

FIG. 3 is a sectional view of a central housing assembly that may be included in a steer-by-wire system. In one example, the central housing may be the same or similar to the central housing assembly 210 included in the steer-by-wire system 100. Components illustrated with respect to the steer-by-wire system 100 that are shown in FIGS. 1-2 are labeled similarly and not reintroduced. A portion of the electric motor 104 is shown in a sectional view to reveal internal arrangements of the components.

In one example, the central housing assembly 210 is formed of two parts including a first housing 302 and a second housing 304. The first housing 302 and the second housing 304 may be joined by fasteners. For example, the fasteners may be bolts 368. The electric motor 104 is directly mounted on the central housing assembly 210. In one example, at least a portion 352 of the electric motor 104 may be joined by fasteners to the first housing 302 using bolts (not shown).

The bevel gear set (e.g., bevel gear set 112) comprises a first bevel gear and a second bevel gear. In one example, the first bevel gear may be an input bevel gear 306 and the second bevel gear may be an output bevel gear 308. In one example, the input bevel gear 306 may be the driving gear and the output bevel gear 308 may be the driven gear. The input bevel gear 306 may be mounted on the motor input shaft 222. For example, the motor input shaft 222 may insert into a cylindrical recess 328 of the input bevel gear 306. The motor input shaft 222 and input bevel gear 306 mounted thereto rotate about a third axis 324. The third axis 324 may be parallel with the y-axis. Teeth 340 of the input bevel gear 306 engage with teeth 342 of the output bevel gear 308. Rotation of the input bevel gear 306 drives rotation of the output bevel gear 308 about a fourth axis 344. The fourth axis 344 may be perpendicular to the third axis 324 and parallel with the x-axis.

A gasket 330, such as an o-ring, may be seated in the cylindrical recess 328 and compressed during assembly, forming a seal at an interface between the cylindrical recess 328 and the motor input shaft 222. A first ball bearing 312 may be support an interface between a housing component 338 of the electric motor 104 and the input bevel gear 306. The first ball bearing 312 may use a first shim 332 to set or adjust pre-load on the bearing races to ensure that the first ball bearing 312 rolls as intended. The first ball bearing 312 may further include internal circlip 334 and external circlip 336.

The ball screw arrangement (e.g., ball screw arrangement 114) may comprise a ball screw nut 310 and a ball screw shaft 318. In one example, the ball screw nut 310 is an open cylinder having a wall 350 of varying depth and a bore 356 having a diameter of approximately a first dimension 358. In one example, the ball screw nut 310 is enclosed by the central housing assembly 210. The output bevel gear 308 is drivingly engaged with the ball screw nut 310 such that rotation of the output bevel gear 308 drives rotation of the ball screw nut 310. The output bevel gear 308 and the ball screw nut 310 rotate about the fourth axis 344. In one example, the engagement of the output bevel gear 308 with the ball screw nut 310 may be supported by a plurality of fasteners. In the example of FIG. 3, the fasteners may be screws 326 inserted through a plurality of through-holes 360 of a flange 362 of the ball screw nut 310. In another example, the engagement is supported by locking pins. The engagement supported by locking pins provides overload protection for reducing external loads, e.g., impact loads, on the vehicle wheels from reaching the electric motor 104. The protection is achieved by the locking pins disengaging the coupling between the ball screw nut 310 and the output bevel gear 308 in response to the ball screw arrangement encountering an external impact load greater than a threshold. An example engagement using locking pins is described in detail with respect to FIGS. 8A-8B.

The ball screw nut 310 may be supported in the central housing assembly 210 by a second ball bearing 314 and a third ball bearing 316. The ball screw nut 310 is connected to the ball screw shaft 318 and supported in the central housing assembly 210 by the second ball bearing 314, the third ball bearing 316. The ball screw shaft 318 is supported on either end in the housing by bush 320. The bush 320 supports the ball screw shaft 318 against radial loads coming on the ball screw shaft 318. Wiper seals 322, which are arranged exterior-facing after the bush 320, prevent dust and dirt from entering the central housing assembly 210. The wiper seals 322 may be installed in the central housing assembly 210.

The ball screw shaft 318 is a long cylindrical shaft that may be partially enclosed by the central housing assembly 210. The ball screw shaft 318 may include a first bore 346 arranged on an opposite end from a second bore 348. In one example, the first bore 346 and the second bore 348 are mounts. For example, the first connecting rod 216 may couple the ball screw shaft 318 to the first knuckle assembly 122 via the first bore 346. The second connecting rod 218 may couple the ball screw shaft 318 to the second knuckle assembly 124 via the second bore 348. The fourth axis 344 bisects the first bore 346 and the second bore 348.

The ball screw nut 310 and the ball screw shaft 318 are concentric. For example, the central axis of the ball screw nut 310 may be the fourth axis 344. A diameter of the ball screw shaft 318 may be slightly smaller than the diameter of the bore 356 of the ball screw nut 310 (e.g., less than the first dimension 358). The ball screw shaft 318 has axial degree of freedom along the X-axis. The rotation of the ball screw shaft 318 is prevented by the pin connections of the connecting rods, which are along the Z-axis. As the ball screw nut 310 rotates, the ball screw shaft 318 glides on the bush 320 axially with respect to the fourth axis 344. A detail view 500 of the ball screw arrangement 114 is described with respect to FIG. 5.

FIG. 4 is a cross section of a knuckle assembly that may be included in a steer-by-wire system. In one example, the knuckle assembly may be the same or similar to the first knuckle assembly 122 included in the steer-by-wire system 100. In one example, the second knuckle assembly 124 may be similarly arranged. Components illustrated with respect to the steer-by-wire system 100 that are shown in FIGS. 1-3 are labeled similarly and not reintroduced.

The first knuckle assembly 122 includes the first knuckle housing 212. The first knuckle housing 212 may be coupled to an underside of the axle frame 208 with a first pivot pin 402 and to an upper side of the axle frame 208 with a second pivot pin 412. In the example, the first knuckle assembly 122 is coupled to the first road wheel assembly 116 via the pivot pins. The first road wheel assembly 116 oscillates about the first pivot point 294. The first pivot pin 402 may have step diameters from first end 424 to a middle section 426 such that the first end may have a diameter of a wider, first dimension 420 and the middle section may have a diameter of a narrower, second dimension 422. The first knuckle housing 212 may mount over the middle section 426 of the first pivot pin 402.

The first knuckle assembly 122 may include an end plate 414. A first fastener 418 may couple the end plate 414 to the axle frame 208. The sensor 108, such as a Hall effect sensor, is mounted on the end plate 414 by use of fastener 416: The first knuckle assembly 122 may be supported by a plurality of roller bearings. In one example, the plurality of roller bearings include a first roller bearing 404a positioned between the first knuckle housing 212 and the first pivot pin 402, and a second roller bearing 404b positioned between the first knuckle housing 212 and the second pivot pin 412. In one example, the first roller bearing 404a and the second roller bearing 404b may each be taper roller bearings. A first oil seal 405a may be positioned between the first knuckle housing 212 and the first roller bearing 404a. A second oil seal 405b may be positioned between the first knuckle housing 212 and the second roller bearing 404b.

A wheel hub 406 is mounted on the first knuckle housing 212. A pair of roller bearings 408a, 408b is positioned between the wheel hub 406 and the first knuckle housing 212. A third oil seal 409 may be captured between the pair of roller bearings 408a, 408b and the first wheel rim 220. The first wheel rim 220 may be fastened to the wheel hub 406 via a bolt 410. The first road wheel 221 may be installed on the first wheel rim 220. The first road wheel 221 rotates about the wheel axis of rotation 292.

The sensor 108 is coupled to the axle frame 208 over the end plate 414 via the fastener 416. The first knuckle housing 212 is supported by the first roller bearing 404a and the second roller bearing 404b and is pivoted around the first pivot pin 402 and the second pivot pin 412. The sensor 108 may act as a feedback system to the controller 106 by, for example, relaying a sensor signal indicating a steering angle.

FIG. 5 is a detail view 500 of a ball screw arrangement that may be included in a steer-by-wire system. In one example, the ball screw arrangement may be the same or similar to the ball screw arrangement 114 included in the steer-by-wire system 100. Components illustrated with respect to the steer-by-wire system 100 that are shown in FIGS. 1-4 are labeled similarly and not reintroduced.

The ball screw nut 310 includes a nut surface formed of helical threads 502. The ball screw shaft 318 includes a shaft surface formed with helical threads 504. The helical threads 502 of the ball screw nut 310 are complementary is size and shape to the helical threads 504 of the ball screw shaft 318. The helical threads 502, 504 may have an approximately semicircular cross section.

The ball screw arrangement includes a plurality of balls 506. Each ball of the plurality of balls 506 extends partially into the complementary helical threads 502, 504 between the ball screw nut 310 and the ball screw shaft 318. In other words, each ball of the plurality of balls 506 is captured in a groove 508 formed by the complementary helical threads 502, 504. The plurality of balls 506 provides rolling engagement between the ball screw nut 310 and the ball screw shaft 318.

As the ball screw nut 310 rotates about the fourth axis 344, the plurality of balls 506 pass through the groove 508 formed by the helical threads 502, 504, converting the rotary motion of the ball screw nut 310 to linear motion of the ball screw shaft 318. The ball screw shaft 318 moves (or slides) in a linear direction with respect to the fourth axis 344. In one example, the balls are recirculated via a return groove (not shown) in the ball screw nut 310.

FIG. 6 shows a flow chart illustrating a method 600 for operation of a steer-by-wire system. In one example, the steer-by-wire system may be the same or similar to the steer-by-wire system 100 described with respect to FIGS. 1-5 and FIGS. 7A-8B, which are described below. The method 600 includes parallel processes. In a first process, the controller controls vehicle steering following a steer-by-wire control logic. At the same time that steer-by-wire is operational, in a second process, the method 600 includes operating the vehicle with overload protection. Overload protection is a mechanical operation that operates in parallel with steer-by-wire control to protect the motor from external impact load exceeding a load limit. Instructions for carrying out the method 600 may be executed by a controller based on instructions stored on a memory of the controller (e.g., controller 106) and in conjunction with signals received from sensors of steer-by-wire system, such as the sensors (e.g., sensor 108) described above with respect to FIG. 1. The controller may employ actuators of the steer-by-wire system (e.g., actuator 110, electric motor 104) to adjust the steering axle operation, according to the methods described below.

At 601, the method 600 includes operating the vehicle with steer-by-wire. In one example, the steer-by-wire operation is executed by the controller of the system in response to the control signals received from the feedback actuator and steering sensor. The control logic is described in detail below.

At 602, at the same time that steer-by-wire is operational, the method 600 includes operating the vehicle with overload protection. While steering is ongoing, overload protection operates to prevent impact load coming from the driving wheels onto the ball screw shaft from reaching the motor (e.g., electric motor 104, ball screw shaft 318). In one example, an external impact load encountered by the ball screw shaft exceeding a load threshold asserts a rotational force on the ball screw nut. In one example, the threshold load may be determined by applying a maximum load on the steer axle and steering the axle to the full steering angle. The torque required by the motor may be determined and set as the threshold load. The rotation force is exerted on the locking pins and corresponding springs that couple the ball screw nut and the output bevel gear. As the locking pins are pushed, the output bevel gear is released from engagement with the ball screw nut, allowing the ball screw nut to rotate freely and without transferring power to bevel gear set and the electric motor coupled thereto. The free rotation of the ball screw nut continues until the impact load decreases below a threshold. In response to the impact load decreasing below the threshold load, each corresponding spring pushes against the locking pins thereby engaging with the output bevel gear and allowing rotation of the ball screw nut. In other words, normal engagement of the output bevel gear coupled to the ball screw nut resumes upon alignment of each locking pin with the corresponding slot. The overload protection operates continuously while steering is ongoing, disconnecting the ball screw nut and output bevel gear in response to impact load on the ball screw shaft and reconnecting when the load decreases.

Continuing with the steer-by-wire control logic, at 603, the method 600 includes receiving a road wheel position. For example, the road wheel position may be received based on a signal from a knuckle-integrated steering sensor of the steering axle (e.g., sensor 108 in FIG. 1). The sensor may read an actual road wheel position or steering angle of the driving wheels. For example, the sensor may calculate an amount of angular displacement in degrees (to the left or to the right) from a center positon, where the center position may be defined as the point where the road wheels are directed straight.

At 604, the method 600 includes determining whether a steer request or input from a driver is received. In one example, the input may be generated by the driver rotating an actuator coupled to the steering wheel (e.g., actuator 110 coupled to steering wheel 102 in FIG. 1). In one example, in response to rotation of the actuator, the controller may determine a steering request is received from the driver. Conversely, in response to no rotation of the actuator, the controller may determine no request is received from the driver.

The method ends in response to determining no steering request is received.

The method continues to 606 in response to determining a steering request is received. At 606, the method 600 includes calculating a steering angle error. The calculation may be the difference between the input e.g., the steering request, and the actual angle of the road wheel position received from the sensor. For example, the input may be the angular displacement in degrees from a center position of the steering wheel and the actual position may be the angular displacement in degrees from the center position of the road wheel.

At 608, the method 600 includes determining a direction of rotation. In one example, the direction of rotation is determined based on the value sign of the steering angle error. The steering angle error may be a positive (+) value or a negative (−) value.

The method 600 continues to 610 in response to determining a negative error value sign. At 610, having determined the negative error value, the controller will operate the electric motor in a clockwise direction. For example, the controller may determine a control signal to send to the electric motor, such as a pulse width of the control signal, based on the determination of the negative error value. In one example, clockwise may be relative to the front of the electric motor, where the front of the motor may be the input shaft side and the electric motor rotates rightward with respect to the front of the motor.

The method 600 continues to 612 in response to determining a positive error value sign. At 614, having determined the positive error value, the controller will operate the electric motor in a counter clockwise direction. For example, the controller may determine a control signal to send to the electric motor, such as a pulse width of the control signal, based on the determination of the positive error value. In one example, counter clockwise may be relative to the front of the electric motor, where the front of the motor may be the input shaft side and the electric motor rotates leftward with respect to the front of the motor.

At 614, the method 600 calculates the steering angle error. In one example, the calculation may be performed similar as above with respect to 606. For example, the calculation may be the difference between the input as communicated by the driver via the steering actuator and the actual position of the road wheels as indicated by the steering sensor.

At 616, the method 600 determines whether the steering angle error is less than a threshold error. The threshold error may be a non-zero, calibratable threshold. In one example, the method 600 may include determining whether the actual steering angle is equal to the input steering angle such that the error is equal to (e.g., nearly, or within a threshold of) zero.

In response to determining the error is less than a threshold error, the method 600 may end.

In response to determining the error is greater than a threshold error, the method may return to 608 for determining a direction of rotation of the electric motor.

In one example, the method may include the controller reducing motor torque when overload protection is estimated or determined to be occurring. For example, during steer-by-wire operation, the controller may send a control signal to the electric motor, and in response to the steering sensor indicating no change in road wheel position (or less than a threshold change), the controller may estimate overload protection is occurring and reduce motor torque.

In this way, the mechanical overload protection operation allows for the use of a steer-by-wire control logic that relies on relatively few signal inputs at the same time reducing wear on the electric motor from external impact load. This is advantageous in in work site environments and particularly so with the highly-responsive steer-by-wire system disclosed. The disclosed system, including the increased turning range provided by the perpendicular mounted motor, enables the driver to navigate in narrower spaces more quickly and with more deliberate control; however, enabling the driver to work more quickly can increase the incidence of greater, or more frequent external impact on the wheels. The disclosed system mechanically disengages the motor from the source of impact until the impact subsides, which reduces wear on the motor without adding additional control logic, sensors, etc.

Turning now to FIGS. 7A-7C, examples of steering control using a steer-by-wire system are illustrated. The steer-by-wire system may be the steer-by-wire system 100.

Components referenced with respect to the steer-by-wire system 100 that are shown in FIGS. 1-5 are labeled similarly and not reintroduced. In some examples, components of the steer-by-wire system 100 that are not illustrated in FIGS. 7A-7C may be understood to be included therein, such as, the controller 106, the actuator 110, the battery 202, and so on.

FIG. 7A shows the steer-by-wire system 100 included in a vehicle such as a forklift truck 700. In the example, the steer-by-wire system 100 includes the steering axle 130 positioned in a rear end 702 of the forklift truck 700, where the rear is relative to a forward-facing direction of a driver operating the steering wheel 102. The steer-by-wire system 100 may enable pivoting of the rear wheels relative to the front wheels to allow navigation of the forklift truck 700 through turns.

In one example, power from the battery (e.g., battery 202) supplied to electric motor 104 drives the rotation of the motor input shaft 222 and the input bevel gear (e.g., input bevel gear 306) of the bevel gear set 112 mounted thereon. First double arrow 704 indicates a direction of rotation of the motor input shaft 222 and input bevel gear. As described above with respect to FIG. 6, rotation may be clockwise or counter clockwise about an axis of rotation (e.g., third axis 324) that may be parallel with the y-axis. The direction of rotation may be determined based on input from the driver via the steering actuator (e.g., actuator 110) and the steering sensor (e.g., sensor 108).

In one example, power from the electric motor 104 drives the output bevel gear (e.g., output bevel gear 308) of the bevel gear set 112 via an engagement with the input bevel gear. Due to the output bevel gear being arranged perpendicular to the input bevel gear, the rotational energy transfers to the output bevel gear at a right angle. Second double arrow 706 indicates a direction of rotation of the output bevel gear and the ball screw nut (e.g., ball screw nut 310) of the ball screw arrangement 114 coupled thereto. The direction of rotation may be in a first direction or a second direction about an axis of rotation (e.g., fourth axis 344) that may be parallel with the x-axis.

Rotational power transferred to the ball screw nut drives the ball screw shaft of the ball screw arrangement 114 linearly. A third double arrow 708 indicates a direction of movement of the ball screw shaft. In one example, the direction of movement may be parallel with the x-axis. In one example, linear movement of the ball screw shaft in a first direction compels the first knuckle assembly 122 and the first road wheel assembly 116 mounted thereto to rotate in a first direction about the hinged connection with the first connecting rod 216. Linear movement of the ball screw shaft in a second direction compels the first knuckle assembly 122 and the first road wheel assembly 116 mounted thereto to rotate in a second direction about the hinged connection with the first connecting rod 216. A fourth double arrow 710 indicates a direction of rotation of the first knuckle assembly 122 about the hinged connection. The second knuckle assembly 124 and second road wheel assembly 117 may rotate similarly in response to the linear movement of the ball screw shaft. A fifth double arrow 712 indicates a direction of rotation of the second knuckle assembly 124 about the hinged connection.

FIG. 7B shows an example of the steering axle 130 in a first position 740. A bisecting line 742 is included for reference. The bisecting line 742 divides the steering axle into approximately equal and approximately symmetrical halves for describing a relative position of the ball screw shaft 318. In the example, the electric motor 104 has driven the ball screw shaft 318 to be further to the left of the bisecting line 742. With the ball screw shaft 318 driven leftward, the second connecting rod 218 is pulled leftwards which in turn will rotate the second knuckle assembly 124 in a clockwise direction in the same way the first connecting rod 216 is pushed leftwards which in turn will rotate the first knuckle assembly 122 clockwise. The relation of the rotation angle of the knuckle assemblies is determined by the length of the mechanical linkages that may include the ball screw, tie rod, and the arm length of the knuckles. In one example, the first position 740 shows a left-hand turn.

FIG. 7C shows an example of the steering axle 130 in a second position 770. A bisecting line 772 is included for reference. The bisecting line 772 divides the steering axle into approximately equal and approximately symmetrical halves for describing a relative position of the ball screw shaft. In the example, the electric motor 104 has driven the ball screw shaft 318 to be further to the right of the bisecting line 772. With the ball screw shaft 318 driven rightward, the second connecting rod 218 is pushed rightwards which in turn will rotate the second knuckle assembly 124 in a counter clockwise direction in the same way the first connecting rod 216 is pulled rightwards which in turn will rotate the first knuckle assembly 122 counter clockwise. The relation of the rotation angle of the knuckle assemblies is determined by the length of the mechanical linkages that may include the ball screw, tie rod, and the arm length of the knuckles. In one example, the second position 770 shows a right hand turn.

Figures 8A, 8B:
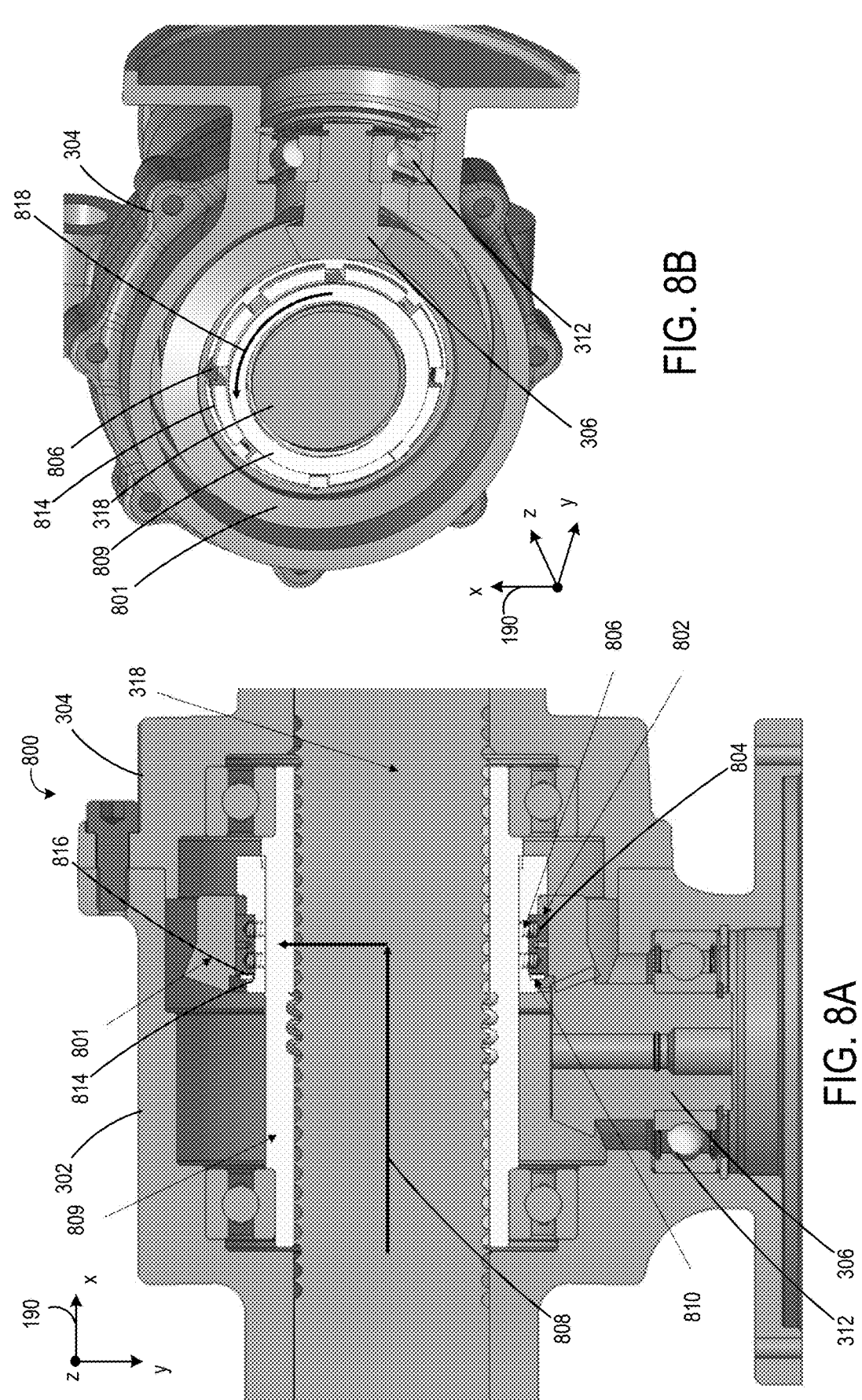
FIG. 8A is detail cross section of an overload protection arrangement for the steer-by-wire system shown in FIG. 1.
FIG. 8B is another view the overload protection arrangement shown in FIG. 8A.
Figures 9, 10:
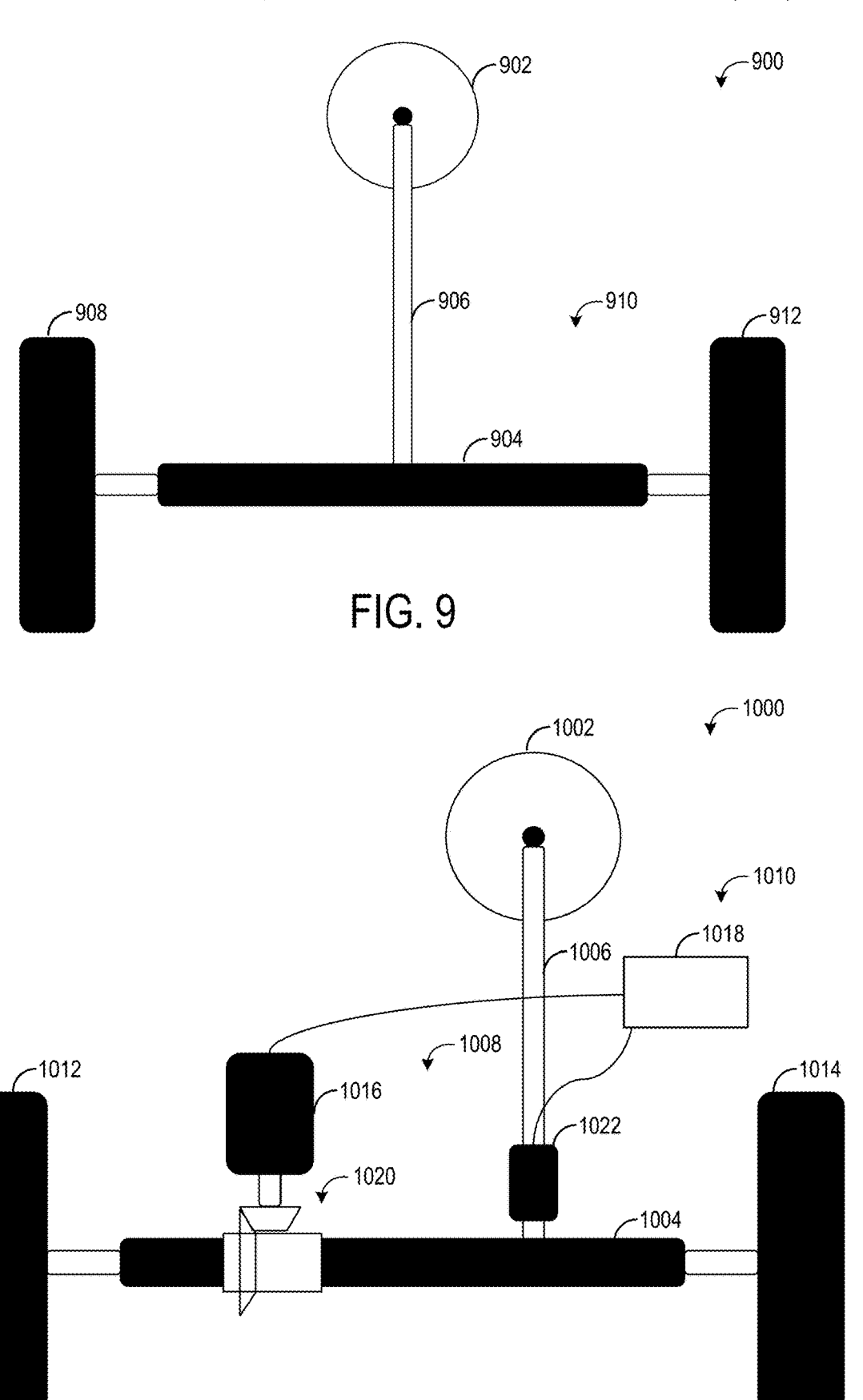
FIG. 9 is a schematic diagram of a traditional steering system.
FIG. 10 is a schematic diagram of a steering system having a steering assist mechanism.

FIG. 8A and FIG. 8B show an example of an overload protection arrangement 800 for a steer-by-wire system. In one example, the overload protection arrangement 800 may be included in the steer-by-wire system 100 described with reference to FIGS. 1-5, and 7A-7C. Components illustrated with respect to the steer-by-wire system 100 are included in FIGS. 8A-8B are labeled similarly and not reintroduced.

FIG. 8A shows a cross section of the overload protection arrangement 800. The overload protection arrangement 800 protects and cushions the electric steering system from load impact. For example, impact load coming from the road wheels (e.g., first road wheel assembly 116 and second road wheel assembly 117) onto the ball screw shaft 318 may be cushioned by the overload protection arrangement 800 to protect the motor (e.g., electric motor 104) from the impact. In one example, an output bevel gear 801 is normally coupled to the ball screw nut 809 via a plurality of locking pins (or latching pins) 802. The locking pins 802 may be tapered in some examples. Each of the locking pins 802 engage with a corresponding slot 804 in the output bevel gear 801. The engagement is due to a corresponding spring 806 acting on each of the locking pins 802. In response to an impact load acting on the ball screw nut 809 exceeding a threshold load, each of the locking pins 802 are pushed against the corresponding spring 806 thereby disengaging the output bevel gear 801 and allowing slipping of the ball screw nut 809. In one example, the threshold load may be a non-zero, calibratable load. For example, the threshold load may be calibrated based on vehicle operating conditions. In one example, the threshold load may be determined by applying a maximum load on the steer axle and steering the axle to the full steering angle. The torque required by the motor may be determined and set as the threshold load. The tapered angle and spring force that maintains the locking pin in the engaged position with the bevel gear may be set by initial calculations and later refined by test to set the correct threshold load in the axle.

Axial movement of the output bevel gear 801 may be prevented by a snap-ring 810. In one example, the snap-ring 810 is positioned in a circumferential slot formed between an exterior surface 814 of the ball screw nut 809 and an inward facing surface 816 of the output bevel gear 801.

Arrow 808 illustrates external impact load that may be exerted on the driving wheels and translated to the ball screw shaft 318. In one example, external impact may be encountered due to the vehicle (e.g., a forklift) being steered into an object or an object falling off the vehicle. In one example, an external impact load encountered by the ball screw shaft 318 exceeding the load threshold asserts a rotational force on the ball screw nut 809. The rotation force is exerted on the locking pins and corresponding springs. As the locking pins 802 are pushed, the output bevel gear 801 is released from engagement with the ball screw nut 809, allowing the ball screw nut 809 to rotate freely. In other words, the ball screw nut 809 rotates without transferring power to bevel gear set (e.g., bevel gear set 112) and the electric motor coupled thereto. In response to the impact load decreasing below the threshold load, each corresponding spring 806 pushes against the locking pins 802 thereby engaging with the output bevel gear 801 and allowing rotation of the ball screw nut 809. In other words, normal engagement of the output bevel gear 801 coupled to the ball screw nut 809 resumes upon alignment of each locking pin 802 with the corresponding slot 804. In this way, the overload protection arrangement 800 provides a mechanism for mitigating external impact loads exceeding the threshold load.

FIG. 8B shows a cut section perspective view of the overload protection arrangement 800. In the view a part of the central housing is removed to show relative positioning of the overload protection arrangement 800. The view shows a rotational force 818 having an impact load greater than the threshold load results in disengagement of the output bevel gear 801 from the ball screw nut 809.

FIG. 9 and FIG. 10 are schematic diagrams illustrating traditional steering systems. FIG. 9 shows schematic diagram of a traditional steering system 900 consisting of a steering wheel 902, which is connected to a steering axle 910 comprising steering rack 904 with the help of steering column 906. The steering rack 904 in turn connects to road wheels 908, 912. In this arrangement, steering force is provided by a driver, which will vary as per road conditions, vehicle type, loading etc. Due to mechanical linkage between the steering wheel 902 and the steering axle 910, the force to steer is provided through human effort. With such arrangements, maneuvering of the vehicle is not easy. Additionally, performance of the system tends to deteriorate over time due to component wear. As well, the packaging of the system in the vehicle is also challenging due to the bulkiness of the components.

FIG. 10 shows a schematic diagram of a traditional steering system 1000 incorporating steering assist system 1010. The traditional steering system 1000 consists of a steering wheel 1002, which is connected to a steering axle 1008 comprising a steering rack 1004 with the help of a steering column 1006. The steering rack 1004, in turn, connects to road wheels 1012, 1014. The steering assist system 1010 comprises a controller 1018 in electronic communication with an electric motor 1016 and a steering actuator 1022 positioned on the steering column 10006. The electric motor 1016 is coupled to the steering axle 1008 via a gearbox 1020. The gearbox 1020 is positioned between the steering rack 1004 and the electric motor 1016. The steering actuator 1022 gives a signal to a controller 1018. In response to the signal, the controller 1018 controls the electric motor

1016 to provide assisting torque in the traditional steering system 1000. As compared to traditional systems, less human effort is required to steer the system but component wear and system packaging in the vehicle remains a challenge.

Contrasting with the traditional steering system 900 and the traditional steering system 1000, the disclosed steer-by-wire system (e.g., steer-by-wire system 100) eliminates the steering column (e.g., steering column 906, steering column 1006) as well as bearings and other supports that may be interposed between the steering wheel (e.g., steering wheel 902, steering wheel 1002) and the steering rack (e.g., steering rack 904, steering rack 1004). The mechanical linkages are replaced by electronic communication that may incorporate flexible cables to electronically connect subsystems (e.g., controller 106, electric motor 104, etc.) to each other. With the disclosed system, the human effort required to steer the vehicle (e.g., forklift truck 700) is minimal and may be controlled through the electronic control unit increasing the driver comfort and reducing driver fatigue. Additionally, the controller may adjust control signals according to vehicle conditions vehicle load, terrain, etc., making it a highly efficient system.

In this way, the disclosed steer-by-wire system may provide increased steering control and reduced (human) steering effort, while reducing incidence of component wear and replacement. The steer-by-wire system is a fully electric, non-drive steering axle that may include an electric motor arranged perpendicular to the axle. Such an arrangement may increase steering ratio precision by reducing driving wheel interference with the electric motor at a fully steered position. The steer-by-wire system may be configured for operation without hydraulic oil for actuation, thereby making it an oil-free axle. The steer-by-wire system includes an overload protection arrangement. As a result, the steer-by-wire system may experience reduced component wear. The technical effect of the steer-by-wire system is prolonging a useful life of the assembly components and decreasing costs associated with repair and replacement.

The disclosure also provides support for a steer-by-wire system comprising: an electric motor coupled to a steering axle via a bevel gear set, where a rotor of the electric motor is perpendicular to the steering axle, and the bevel gear set comprises a first bevel gear and a second bevel gear, and, an overload protection arrangement, where the second bevel gear is normally coupled to a ball screw nut via a plurality of locking pins, the plurality of locking pins disengaging from the second bevel gear and allowing slipping of the ball screw nut in response to an external impact load acting on the ball screw nut exceeding a threshold. In a first example of the system, the system further comprises: a controller configured to operate the electric motor based on feedback from a feedback actuator coupled to a steering wheel and a steering sensor coupled to the steering axle. In a second example of the system, optionally including the first example, the first bevel gear is mounted to an input shaft of the electric motor and supported in a central housing by a first ball bearing and the ball screw nut is supported in the central housing by a second ball bearing and a third ball bearing. In a third example of the system, optionally including one or both of the first and second examples, each locking pin of the plurality of locking pins engages a corresponding slot in the second bevel gear due to a corresponding spring acting upon each pin, and in response to the external impact load acting on the ball screw nut exceeding the threshold, each locking pin of the plurality of locking pins pushes against the corresponding spring thereby disengaging the second bevel gear from the ball screw nut. In a fourth example of the system, optionally including one or more or each of the first through third examples the overload protection arrangement further comprising, in response to the external impact load acting on the ball screw nut decreasing below the threshold and alignment of each pin of the plurality of locking pins with the corresponding slot, the corresponding spring pushes against each pin thereby engaging with the second bevel gear and allowing rotation of ball screw nut. In a fifth example of the system, optionally including one or more or each of the first through fourth examples, the system further comprises: a ball screw shaft drivingly engaged with the ball screw nut and coupled to a first knuckle assembly via a first connecting rod and to a second knuckle assembly via a second connecting rod, wherein the first knuckle assembly has a first road wheel assembly rotatably mounted thereon, and the second knuckle assembly has a second road wheel assembly rotatably mounted thereon. In a sixth example of the system, optionally including one or more or each of the first through fifth examples, in response to rotation of the electric motor, the ball screw shaft moves in a linear direction, and where in response to movement in the linear direction, the first road wheel assembly rotates around a first pivot point and the second road wheel assembly rotates around a second pivot point. In a seventh example of the system, optionally including one or more or each of the first through sixth examples, the plurality of locking pins are tapered. In an eighth example of the system, optionally including one or more or each of the first through seventh examples, a steering wheel is not mechanically coupled to the steering axle.

The disclosure also provides support for a method for a vehicle having a steer-by-wire system comprising an electric motor mounted perpendicular to a steering axle via a bevel gear set coupled to a ball screw arrangement, the method comprising: driving the bevel gear set and the ball screw arrangement with the electric motor to provide steer-by-wire operation and during the steer-by-wire operation, disconnecting the bevel gear set from the ball screw arrangement in response to an external impact load increasing above a threshold. In a first example of the method, the bevel gear set comprises a first bevel gear mounted to the electric motor and a second bevel gear normally coupled to a ball screw nut of the ball screw arrangement with a plurality of locking pins. In a second example of the method, optionally including the first example, each locking pin of the plurality of locking pins engages a corresponding slot in the second bevel gear due to a corresponding spring acting upon each pin, and in response to the external impact load acting on the ball screw nut exceeding the threshold, each locking pin of the plurality of locking pins pushes against the corresponding spring thereby disengaging the second bevel gear from the ball screw nut, and in response to the external impact load acting on the ball screw nut decreasing below the threshold and alignment of each pin of the plurality of locking pins with the corresponding slot, the corresponding spring pushes against each pin thereby engaging with the second bevel gear and allowing rotation of ball screw nut. In a third example of the method, optionally including one or both of the first and second examples, the steer-by-wire operation comprises receiving a road wheel position from a steering sensor, determining a steering angle error based on a difference between a steer request and the road wheel position, and operating the electric motor based on a value sign of the steering angle error. In a fourth example of the method, optionally including one or more or each of the first through third examples, operating the electric motor includes determining a direction of rotation of the electric motor based on the value sign of the steering angle error, and in response to the value sign of the steering angle error being positive, operating the electric motor in a counter clockwise direction, and in response to the value sign of the steering angle error being negative, operating the electric motor in a clockwise direction. In a fifth example of the method, optionally including one or more or each of the first through fourth examples, the vehicle is a forklift.

The disclosure also provides support for a vehicle system comprising: an electric motor coupled to a steering axle via a bevel gear set, where a rotor of the electric motor is perpendicular to the steering axle, and the bevel gear set comprises a first bevel gear and a second bevel gear, and, an overload protection arrangement, where the second bevel gear is normally coupled to a ball screw nut via a plurality of locking pins, the plurality of locking pins disengaging from the second bevel gear and allowing slipping of the ball screw nut in response to an impact load acting on the ball screw nut exceeding a threshold. In a first example of the system, the system further comprises: a controller configured to operate the electric motor based on feedback from a feedback actuator coupled to a steering wheel and a steering sensor coupled to the steering axle. In a second example of the system, optionally including the first example, the system further comprises: a ball screw shaft drivingly engaged with the ball screw nut and coupled to a first knuckle assembly via a first connecting rod and to a second knuckle assembly via a second connecting rod, wherein the first knuckle assembly has a first road wheel assembly rotatably mounted thereon and the second knuckle assembly has a second road wheel assembly rotatably mounted thereon. In a third example of the system, optionally including one or both of the first and second examples, the first knuckle assembly comprises a first knuckle housing, a first pivot pin, and a plurality of roller bearings, wherein the first knuckle housing is coupled to an axle frame via the first pivot pin and supported by the plurality of roller bearings. In a fourth example of the system, optionally including one or more or each of the first through third examples, in response to rotation of the electric motor, the ball screw shaft moves in a linear direction, and where in response to movement in the linear direction, the first road wheel assembly rotates around a first pivot point, and the second road wheel assembly rotates around a second pivot point.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A steer-by-wire system comprising:
   an electric motor coupled to a steering axle via a bevel gear set, where a rotor of the electric motor is perpendicular to the steering axle, and the bevel gear set comprises a first bevel gear and a second bevel gear; and,
   an overload protection arrangement, where the second bevel gear is normally coupled to a ball screw nut via a plurality of locking pins, the plurality of locking pins disengaging from the second bevel gear and allowing slipping of the ball screw nut in response to an external impact load acting on the ball screw nut exceeding a threshold.

2. The steer-by-wire system of claim 1, further comprising, a controller configured to operate the electric motor based on feedback from a feedback actuator coupled to a steering wheel and a steering sensor coupled to the steering axle.

3. The steer-by-wire system of claim 1, wherein the first bevel gear is mounted to an input shaft of the electric motor and supported in a central housing by a first ball bearing and the ball screw nut is supported in the central housing by a second ball bearing and a third ball bearing.

4. The steer-by-wire system of claim 1, wherein each locking pin of the plurality of locking pins engages a corresponding slot in the second bevel gear due to a corresponding spring acting upon each pin, and in response to the external impact load acting on the ball screw nut exceeding the threshold, each locking pin of the plurality of locking pins pushes against the corresponding spring thereby disengaging the second bevel gear from the ball screw nut.

5. The steer-by-wire system of claim 4, the overload protection arrangement further comprising, in response to the external impact load acting on the ball screw nut decreasing below the threshold and alignment of each pin of the plurality of locking pins with the corresponding slot, the corresponding spring pushes against each pin thereby engaging with the second bevel gear and allowing rotation of ball screw nut.

6. The steer-by-wire system of claim 1, further comprising a ball screw shaft drivingly engaged with the ball screw nut and coupled to a first knuckle assembly via a first connecting rod and to a second knuckle assembly via a second connecting rod, wherein the first knuckle assembly has a first road wheel assembly rotatably mounted thereon, and the second knuckle assembly has a second road wheel assembly rotatably mounted thereon.

7. The steer-by-wire system of claim 6, where in response to rotation of the electric motor, the ball screw shaft moves in a linear direction, and where in response to movement in the linear direction, the first road wheel assembly rotates around a first pivot point and the second road wheel assembly rotates around a second pivot point.

8. The steer-by-wire system of claim 1, wherein the plurality of locking pins are tapered.

9. The steer-by-wire system of claim 1, wherein a steering wheel is not mechanically coupled to the steering axle.

10. A method for a vehicle having a steer-by-wire system comprising an electric motor mounted perpendicular to a steering axle via a bevel gear set coupled to a ball screw arrangement, the method comprising:

driving the bevel gear set and the ball screw arrangement with the electric motor to provide steer-by-wire operation and during the steer-by-wire operation, disconnecting the bevel gear set from the ball screw arrangement in response to an external impact load increasing above a threshold, wherein the bevel gear set comprises a first bevel gear mounted to the electric motor and a second bevel gear normally coupled to a ball screw nut of the ball screw arrangement with a plurality of locking pins, and wherein each locking pin of the plurality of locking pins engages a corresponding slot in the second bevel gear due to a corresponding spring acting upon each pin, and in response to the external impact load acting on the ball screw nut exceeding the threshold, each locking pin of the plurality of locking pins pushes against the corresponding spring thereby disengaging the second bevel gear from the ball screw nut.

11. The method of claim 10, wherein in response to the external impact load acting on the ball screw nut decreasing below the threshold and alignment of each pin of the plurality of locking pins with the corresponding slot, the corresponding spring pushes against each pin thereby engaging with the second bevel gear and allowing rotation of ball screw nut.

12. The method of claim 10, wherein the steer-by-wire operation comprises receiving a road wheel position from a steering sensor; determining a steering angle error based on a difference between a steer request and the road wheel position; and operating the electric motor based on a value sign of the steering angle error.

13. The method of claim 12, wherein operating the electric motor includes determining a direction of rotation of the electric motor based on the value sign of the steering angle error, and in response to the value sign of the steering angle error being positive, operating the electric motor in a counter clockwise direction, and in response to the value sign of the steering angle error being negative, operating the electric motor in a clockwise direction.

14. The method of claim 10, wherein the vehicle is a forklift.

15. A vehicle system comprising:

an electric motor coupled to a steering axle via a bevel gear set, where a rotor of the electric motor is perpendicular to the steering axle, and the bevel gear set comprises a first bevel gear and a second bevel gear; and, an overload protection arrangement, where the second bevel gear is normally coupled to a ball screw nut via a plurality of locking pins, the plurality of locking pins disengaging from the second bevel gear and allowing slipping of the ball screw nut in response to an impact load acting on the ball screw nut exceeding a threshold, and where each locking pin of the plurality of locking pins engages a corresponding slot in the second bevel gear due to a corresponding spring acting upon each pin.

16. The vehicle system of claim 15, further comprising a controller configured to operate the electric motor based on feedback from a feedback actuator coupled to a steering wheel and a steering sensor coupled to the steering axle.

17. The vehicle system of claim 15, further comprising a ball screw shaft drivingly engaged with the ball screw nut and coupled to a first knuckle assembly via a first connecting rod and to a second knuckle assembly via a second connecting rod, wherein the first knuckle assembly has a first road wheel assembly rotatably mounted thereon and the second knuckle assembly has a second road wheel assembly rotatably mounted thereon.

18. The vehicle system of claim 17, wherein the first knuckle assembly comprises a first knuckle housing, a first pivot pin, and a plurality of roller bearings, wherein the first knuckle housing is coupled to an axle frame via the first pivot pin and supported by the plurality of roller bearings.

19. The vehicle system of claim 17, where in response to rotation of the electric motor, the ball screw shaft moves in a linear direction, and where in response to movement in the linear direction, the first road wheel assembly rotates around a first pivot point, and the second road wheel assembly rotates around a second pivot point.

* * * * *